Feb. 6, 1923.
L. D. HOPFIELD
LAND LEVELING DEVICE
Filed Nov. 29, 1920
1,444,543
3 sheets-sheet 3
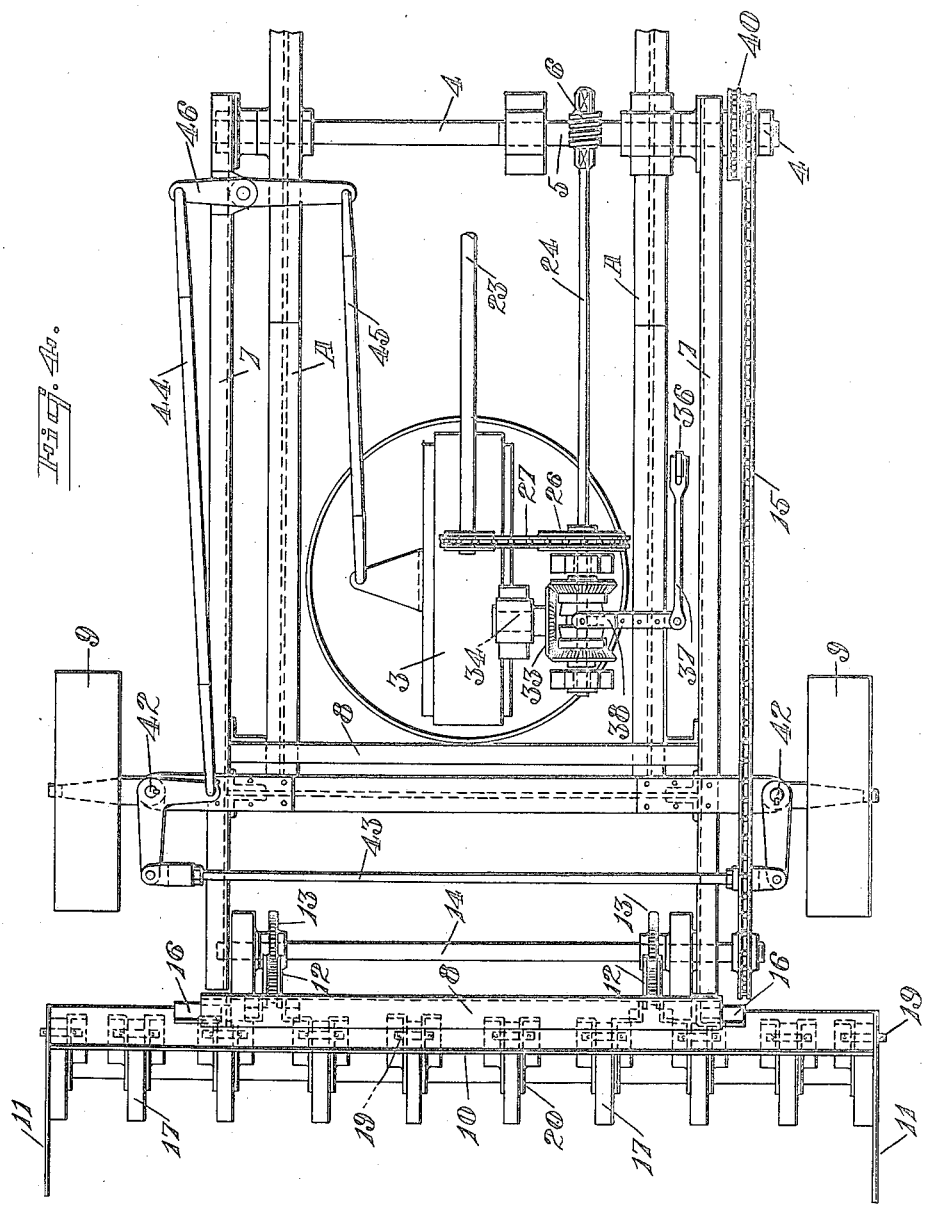
INVENTOR.
LEWIS D. HOPFIELD.
BY Chas. E. Townsend.
ATTORNEY Patented Feb. 6, 1923.

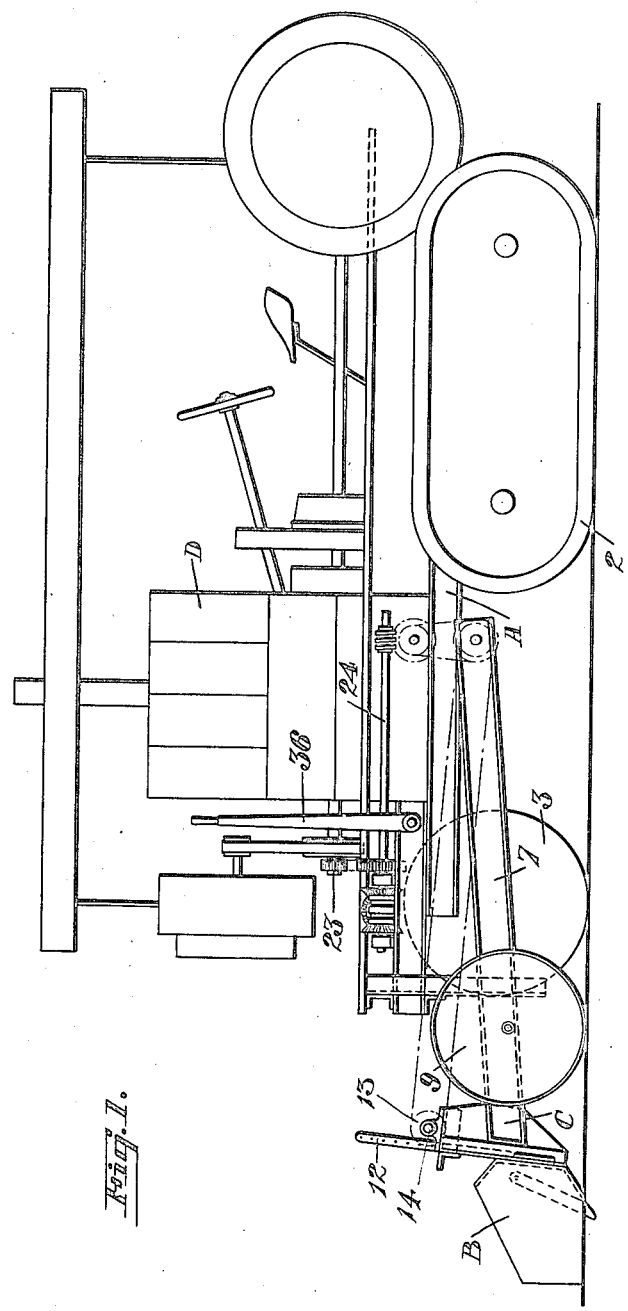

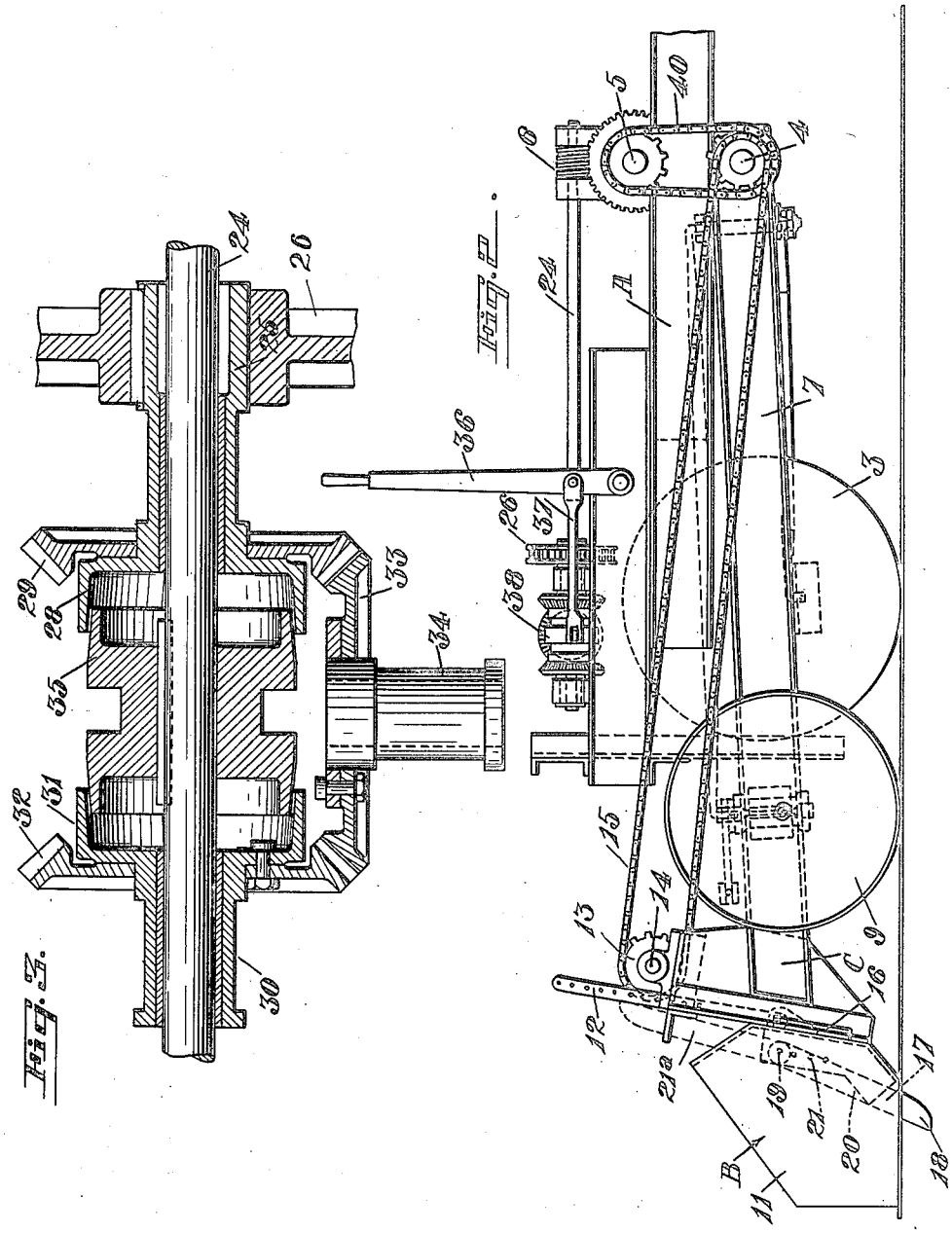

1,444,543

UNITED STATES PATENT OFFICE.

LEWIS D. HOPFIELD, OF NATOMA, CALIFORNIA.

LAND-LEVELING DEVICE.

Application filed November 29, 1920. Serial No. 426,922.

*To all whom it may concern:*

Be it known that I, LEWIS D. HOPFIELD, a citizen of the United States, residing at Natoma, in the county of Sacramento and State of California, have invented new and useful Improvements in Land-Leveling Devices, of which the following is a specification.

This invention relates to a land leveling device, and especially to improvements on the structure shown in my Patent No. 1,332,872, entitled "Land leveling device," issued March 2, 1920.

One of the objects of the present invention is to provide a simple, substantial and easily operated scraper, which is particularly adapted for road work, land leveling and the like, and which is so constructed that it may be readily attached to a tractor or similar power driven unit and operated therefrom.

Another object of the invention is to provide an independent frame for the support of the scraper, wheels on one end of said frame and a novel connection between the opposite end of the frame and the main frame of the tractor which will permit free vertical movement of the scraper and the supporting frame with relation to the tractor when travelling over uneven ground.

Another object of the invention is to provide means for attaching teeth to the scraper, said attachment permitting the teeth to be swung out of digging position, and also permitting vertical adjustment when in digging position.

Another object of the invention is to so support the digging teeth that they will only enter and break the ground when travelling in a forward direction, and when travelling in a reverse direction will swing and ride freely upon the surface.

Another object of the invention is to provide means for raising and lowering the scraper and the teeth supported thereby with relation to the ground surface and the frame by which they are supported; further to provide means whereby engine power may be transmitted for this purpose.

Other objects will hereinafter appear.

The invention consists of the parts and the construction, combination and arrangement of parts as hereinafter more fully described and claimed, having reference to the accompanying drawings, in which—

Fig. 1 is a side elevation of a tractor showing the application of the invention.

Fig. 2 is an enlarged side elevation of the land leveling device showing it attached to the front end of a tractor.

Fig. 3 is a longitudinal detail section of the clutches and gears through which engine power is transmitted to raise or lower the scraper.

Fig. 4 is a plan view of Fig. 2.

Referring to the drawings in detail, A indicates the main frame of a tractor, which, in this instance, is driven by a pair of endless self-laying tracks, such as indicated at 2, and steered in any suitable manner, or as here shown by a front tiller wheel 3. Extending crosswise of the main frame A is a shaft 4 which is secured in suitable journal members; also extending crosswise of the frame and positioned directly above the shaft 4 is a second shaft 5 to which power is transmitted through a worm gear drive 6 in a manner to be hereinafter described.

Disposed in front of the tractor proper is a scraper B, and supporting said scraper is a frame C which consists of a pair of side bars 7 and cross bars 8. The forward end of the frame C is supported by a pair of steering wheels 9, while the rear end of the frame is attached and pivotally connected to the shaft 4. This connection is of considerable importance as it permits the scraper and the frame C to swing freely in a vertical direction about the pivotal connection 4, that is to rise and fall with relation to the main frame A of the tractor when travelling over uneven ground. The scraper proper is vertically adjustable with relation to the frame C and is preferably raised or lowered when adjusted by engine power as will hereinafter be described.

The scraper consists of a back plate 10 and a pair of end plates 11. Pivotally attached to the back plate is a pair of rack bars 12, and engageable with the rack bars are gears 13. These gears are secured on a cross shaft 14 journalled on the forward end of the frame C and power to rotate shaft 14 is transmitted from shaft 4 by means of a sprocket chain as indicated at 15. The scraper is raised and lowered entirely by means of the rack bars 12 and gears 13. It is however provided with shoes 16 which guide and secure it during vertical movement; said shoes 16 also maintaining the rack bars in engagement with their respective gears.

The structural features just described are however more or less unimportant as they are clearly described and form a part of my former patent referred to.

When operating on certain ground it is often found that it is so hard that it cannot be touched by the scraper. In such instances it is usual to plough or otherwise break up the surface before employing the scraper. Such operation requires the use of another machine or another attachment, and to that extent increases the number of tools or machines required. The use of extra machinery is entirely obviated by my device as I have provided means for attaching teeth to the front face of the scraper. These teeth consist of heavy bars 17, approximately rectangular in cross section. The lower ends of the teeth are formed somewhat pointed as at 18 (see Fig. 2), while the upper ends are drilled to receive a securing pin 19. Each tooth 17 is guided between bearing flanges 20, which are drilled as shown at 21 to receive the securing pins 19. A row of holes, such as shown at 21, are generally drilled to permit vertical adjustment of the teeth 17; this being more or less important as it permits adjustment of the digging depth independently of whether the scraper is raised or lowered. The teeth shaped and pointed as shown automatically enter the ground to the desired depth when the tractor moves in a forward direction, but as they are pivotally mounted on supporting pins 19, between bearing lugs 20, it is obvious that they will swing up and ride freely over the ground surface when the tractor is reversed. By providing teeth as shown, it should be obvious that the hard ground surface may be quickly and readily broken up and that the teeth may then be swung upwardly against the scraper frame as indicated by dotted lines at 21ᵃ, and that the scraper may then be lowered to remove the broken ground or surface. In other words one operation may be followed by another and the ground may thus be gradually broken or scraped as conditions will require; each operation being accomplished by the same machine and with practically no loss of time when changing from one operation to another.

As previously stated means are provided for transmitting engine power to raise or lower the scraper B. This is accomplished in the following manner:

Extending from the engine proper, indicated at D, or suitably connected therewith, is a shaft 23. (See Fig. 4.) Disposed parallel with this shaft and suitably supported by the main frame of the tractor is a shaft 24. Turnably mounted on the shaft (see Fig. 3) is a sleeve 25, and secured to one end thereof is a sprocket gear 26 to which power is transmitted from shaft 23 by means of a sprocket chain as indicated at 27. Secured on the opposite end of the sleeve is an exterior cone clutch member 28, and formed integral therewith or secured thereto is a bevel gear 29. Turnably mounted on the opposite end of the shaft 24 is a second sleeve shaft 30. Secured or formed integral therewith is a second exterior cone clutch member 31, and secured thereto is a bevel gear 32. Interposed between the gears 29 and 32 is an idler 33, and supporting said idler is a shaft and a bearing member 34. Slidably mounted on the shaft 24 between the cone clutch members 28 and 31 is a double cone clutch member 35. This is slidably mounted on a feather key and may be thrown into engagement with either clutch member 28 or 31; the clutch member 35 being actuated by a hand lever 36, a link 37 and a shifting collar 38.

In actual practice it must be assumed that the engine D is running. If this is the case shaft 23 connected with the engine will also be running, and power will therefore be transmitted through the chain 27 and the sprocket 26 to rotate the sleeve shaft 25, and as the clutch 28 and gear 29 are secured thereto, it is obvious that these will also continuously rotate. It should further be obvious that the clutch 31 and gear 32 will also be maintained in operation as the intermediate gear 33 will transmit power thereto, but in an opposite direction, that is the clutch 28 and gear 29 will rotate in one direction and the clutch 31 and gear 32 in the opposite direction. No movement will, however, be transmitted to shaft 24 as the members so far described are all mounted to freely rotate about the shaft; however if it is desired to transmit rotary movement to the shaft 24, it is only necessary to move the cone clutch 25 into engagement with one or another of the exterior clutches 28 or 31 and rotation will thereby be transmitted to shaft 24 either in one direction or another, depending upon which clutch is engaged. Rotary movement is only transmitted to the shaft 24 when it is desired to raise or lower the scraper B. This rotary movement of shaft 24 is transmitted through the worm gear drive 6 to shaft 5. It is in turn transmitted from this shaft to the lower shaft 4 by means of a chain drive 40, and it is in turn transmitted to the shaft 14 through the chain drive 15. The scraper may therefore be raised or lowered as the case may be by merely rocking the lever 36 in one direction or another, and it may be transmitted at any time whether the tractor is travelling in a forward or reverse direction, or when standing still, as vertical movement of the scraper supporting frame C does not affect the power transmission in any manner.

The wheels 9 supporting the forward end of the scraper frame are carried by steering knuckles, such as indicated at 42. These knuckles are connected by a tie rod 43 in the usual manner and power to swing the steering knuckles in unison is transmitted through a reach rod 44. The reach rod is in this instance actuated in unison with the tiller wheel 3 through the link and crank arm connections shown at 45 and 46, but it is obvious that an independent steering mechanism might be employed if desired.

From the foregoing description it can be seen that I have provided a scraper and a carriage therefor which may be readily attached to a tractor or other power driven unit, said scraper and carriage riding free and independent of the tractor proper and thereby to a great extent preventing gouging of the ground surface, particularly when travelling over or handling uneven surfaces.

The attachment may be used either as a scraper or as a ground breaker; the change from one operation to another being accomplished with practically no loss of time, as it is only necessary to swing the teeth into digging position, or to raise them out of digging position as the case may be. Vertical adjustment of either the scraper or the teeth carried thereby may be attained at any time, and it can be almost instantly accomplished as engine power is transmitted and is under the control of an operator placed on the forward end of the tractor; transmission of power in either direction to raise or lower the scraper being obtained by the gear transmission located on the tractor and actuated by the cone clutch and lever 26. Power transmitted from shaft 5 may be directly transmitted to shaft 4 or this may be stationary if desired. In that instance it is obvious that the sprockets carried by the shaft should be tied together and be freely turnable upon the shaft.

The many uses to which a scraper of this character may be applied, should be obvious, and the efficiency of the same under certain conditions are, practically speaking, incomparable.

While certain features of the present invention are more or less specifically illustrated, I wish it understood that various changes in form and proportion may be resorted to within the scope of the appended claims; similarly that the materials and finish of the several parts employed may be such as the experience and judgment of the manufacturer may dictate or varying uses may demand.

Having thus described my invention, what I claim and desire to secure by Letters Patent is—

1. A land leveling device comprising a tractor, an auxiliary frame, a pivotal connection between one end of said frame and the tractor, wheels supporting the opposite end of the frame, a scraper carried by the auxiliary frame, means permitting vertical adjustment of the scraper, and means for transmitting power from the engine on the tractor to affect said vertical adjustment.

2. A land leveling device comprising a tractor, an auxiliary frame, a pivotal connection between one end of said frame and the tractor, wheels supporting the opposite end of the frame, a scraper carried by the auxiliary frame, a pair of guide rails on which the scraper is vertically adjustable, a power shaft journaled on the auxiliary frame, means for transmitting power from said shaft to raise or lower the scraper on the guide rails, and means for transmitting engine power from the tractor to operate the power shaft.

3. A land leveling device comprising a tractor, an auxiliary frame, a pivotal connection between one end of said frame and the tractor, wheels supporting the opposite end of the frame, a scraper carried by the auxiliary frame, a pair of guide rails on which the scraper is vertically adjustable, a power shaft journaled on the auxiliary frame, means for transmitting power from said shaft to raise or lower the scraper on the guide rails, means for transmitting engine power from the tractor to operate the power shaft, said means comprising a pair of sprocket wheels turnably mounted on the pivot member to which the auxiliary frame is attached, means for transmitting power to said sprocket wheels, and means for transmitting power from said sprocket wheels to the power shaft.

4. The combination with a tractor having a driving engine mounted thereon, of a shaft extending crosswise of the tractor, an auxiliary frame pivotally attached to said shaft, the opposite end of said frame being supported by steering wheels, a scraper mounted on the auxiliary frame, a reversing gear mounted on the tractor, means for transmitting engine power thereto, and means for transmitting power from the reversing gear to raise or lower the scraper on the auxiliary frame.

5. The combination with a tractor and a driving engine mounted thereon, of a reversing mechanism mounted on the tractor, said reversing mechanism comprising a shaft, a pair of gears freely turnable on the shaft, an intermediate gear connecting said gears, means for transmitting engine power to one of the gears, a clutch member carried by each of the first named gears, a cone clutch keyed and slidably mounted on the shaft adapted to be moved into engagement with either of the first named clutches, a shaft extending crosswise of the tractor, a pair of sprocket gears mounted on the shaft, means for transmitting power from the reversing mechanism shaft to said sprocket gears, an auxiliary frame pivotally attached to the shaft supporting the sprocket gears, wheels supporting the opposite end of the auxiliary frame, a scraper vertically adjustable on the auxiliary frame, and means for transmitting power from the sprocket gears to raise or lower the scraper.

6. In a device of the character described a scraper, a plurality of bearing members on the scraper, and a digging tooth pivotally mounted in each bearing member.

7. In a device of the character described a scraper, a plurality of bearing members on the scraper, a digging tooth pivotally mounted in each bearing member and vertically adjustable therein.

8. In a device of the character described a scraper, a plurality of pairs of bearing brackets secured on the forward face of the scraper, a digging tooth pivotally supported between each pair of bearing brackets, said pivotal mounting permitting each tooth to be turned upwardly beyond a vertical position, out of digging position or to be swung downwardly against the scraper into digging position, and means permitting vertical adjustment of each tooth with relation to its bearing bracket.

9. In combination with a tractor having a driving engine, a running gear and a pivotal auxiliary frame having supporting wheels, of a scraper mounted at the forward end of said auxiliary frame, a plurality of bearing members on the scraper, a digging member pivotally mounted for vertical swinging movement in each bearing member, and means for vertically adjusting the pivotal point of said teeth.

10. In combination with a tractor having a running gear and an auxiliary frame pivotally connected to said tractor and having supporting wheels, of a scraper mounted on said auxiliary frame vertically adjustable in relation thereto, connections between the engine of the tractor and the scraper for vertically adjusting the latter, a plurality of bearing members carried by the scraper, a digging tooth pivotally mounted for vertical swinging movement in each bearing member, and means for vertically adjusting the pivotal points of said teeth.

LEWIS D. HOPFIELD.